United States Patent
Ranjan

(10) Patent No.: US 10,646,969 B2
(45) Date of Patent: May 12, 2020

(54) CROSS FLOW CERAMIC HEAT EXCHANGER AND METHOD FOR MANUFACTURING

(71) Applicant: HAMILTON SUNDSTRAND CORPORATION, Windsor Locks, CT (US)

(72) Inventor: Ram Ranjan, West Hartford, CT (US)

(73) Assignee: HAMILTON SUNSTRAND CORPORATION, Windsor Locks, CT (US)

( * ) Notice: Subject to any disclaimer, the term of this patent is extended or adjusted under 35 U.S.C. 154(b) by 293 days.

(21) Appl. No.: 14/956,439

(22) Filed: Dec. 2, 2015

(65) Prior Publication Data
US 2017/0157722 A1 Jun. 8, 2017

(51) Int. Cl.
*B23P 15/26* (2006.01)
*F28F 21/04* (2006.01)
*F28D 9/00* (2006.01)
*F28F 3/02* (2006.01)
*F28F 13/18* (2006.01)

(52) U.S. Cl.
CPC ............ *B23P 15/26* (2013.01); *F28D 9/0037* (2013.01); *F28F 3/02* (2013.01); *F28F 13/18* (2013.01); *F28F 21/04* (2013.01); *F28F 2250/106* (2013.01); *F28F 2255/18* (2013.01)

(58) Field of Classification Search
CPC .......... F28D 9/0037; F28D 3/02; F28F 21/04; F28F 2250/106; F28F 3/005; F28F 3/046; F28F 3/14
See application file for complete search history.

(56) References Cited

U.S. PATENT DOCUMENTS

| | | | | |
|---|---|---|---|---|
| 1,662,870 A | * | 3/1928 | Stancliffe | F28D 9/0037 165/166 |
| 4,083,400 A | * | 4/1978 | Dziedzic | F28D 9/0037 165/135 |
| 4,270,602 A | * | 6/1981 | Foster | F28D 9/0037 165/167 |
| 4,362,209 A | | 12/1982 | Cleveland | |
| 4,379,109 A | | 4/1983 | Simpson | |

(Continued)

FOREIGN PATENT DOCUMENTS

WO    9837457 A1    8/1998

OTHER PUBLICATIONS

Ross, et al., "Additive Manufacturing for Cost Efficient Production of Compact Ceramic Heat Exchangers and Recuperators"; 2015 NETL Cross-Cutting Research Conference; Apr. 27, 2015; 20 pgs.

(Continued)

*Primary Examiner* — Jon T. Schermerhorn, Jr.
(74) *Attorney, Agent, or Firm* — Cantor Colburn LLP

(57) ABSTRACT

A heat exchanger includes a first additively manufactured layer including axial fins extending in a first direction and transverse fins extending in a second direction transverse to the first direction, the first layer defining a flow path in the first direction. The heat exchanger also includes a second additively manufactured layer including axial fins extending in the second and transverse fins extending in the first direction, the second layer defining a second flow path in the second direction.

10 Claims, 4 Drawing Sheets

(56) References Cited

U.S. PATENT DOCUMENTS

| | | | | |
|---|---|---|---|---|
| 5,626,188 | A | * | 5/1997 | Dewar ................. F28D 9/0037 |
| | | | | 165/166 |
| 7,239,015 | B2 | | 7/2007 | Williams et al. |
| 7,871,578 | B2 | | 1/2011 | Schmidt |
| 8,048,544 | B2 | | 11/2011 | Hofenauer et al. |
| 8,726,976 | B2 | | 5/2014 | Schrader et al. |
| 2013/0209322 | A1 | * | 8/2013 | Gaiser ................... F01N 3/2814 |
| | | | | 422/175 |
| 2015/0021002 | A1 | * | 1/2015 | Hoglund ................ F28F 3/046 |
| | | | | 165/133 |
| 2015/0137412 | A1 | | 5/2015 | Schalansky |

OTHER PUBLICATIONS

European Search Report for Applicaiton No. 16191941.0-1602, dated Apr. 19, 2017 5 Pages.

\* cited by examiner

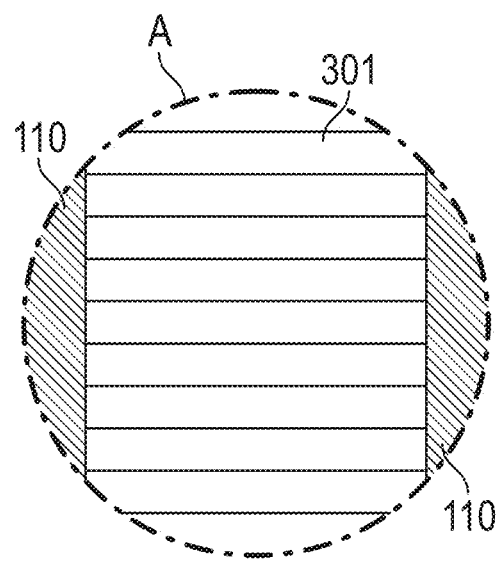 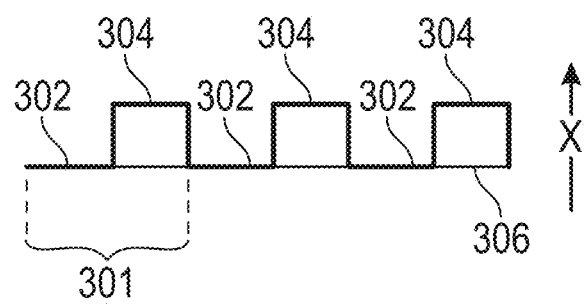
FIG. 3A  FIG. 3B
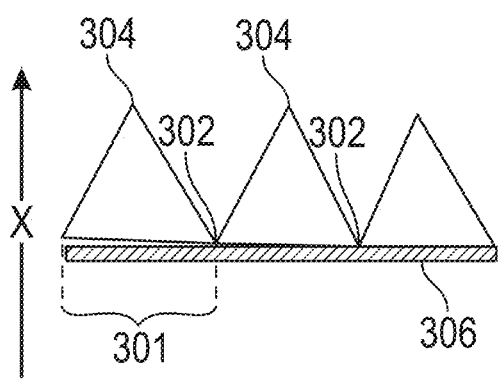 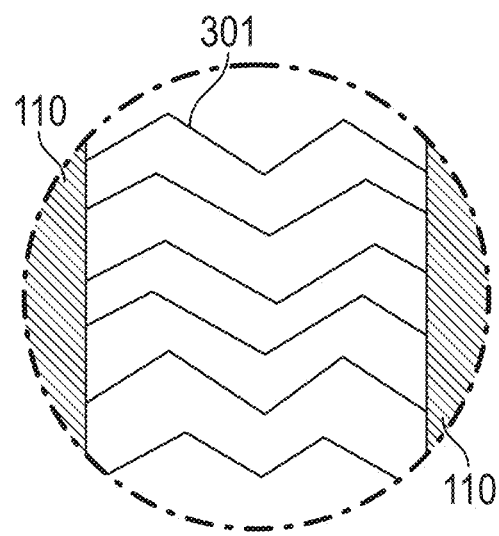
FIG. 3C  FIG. 3D

CROSS FLOW CERAMIC HEAT EXCHANGER AND METHOD FOR MANUFACTURING

STATEMENT OF FEDERAL SUPPORT

This invention was made with government support with DOE NETL under Contract No. DE-FE0024066 with a Sub Contract with support from Ceralink, Inc. under Contract No. PO-C-005. The government therefore has certain rights in this invention.

BACKGROUND

The subject matter disclosed herein generally relates to heat exchangers, and more specifically, to wave fin structure for heat exchangers.

A typical air-to-air plate fin heat exchanger consists of a stack of inter-conductive air flow sections or layers. Hot air and cold air are forced through alternate layers (referred to as "hot" and "cold" layers, respectively, from time to time herein) in order to exchange heat. In a gas turbine blade disk cooling system, the hot air comes from the engine compressor before entering the turbine blade disks and then flows through bleed layers. The cold air is outside air and flows through ram layers in the engine fan ducts. These alternately stacked ram and bleed layers are joined together along a thermally conductive medium called the parting sheet, and heat from the bleed layers is transmitted through the parting sheets to the ram air flow. Of course, heat exchangers could receive air from other sources as well and the teachings herein are not limited to gas turbine management.

The hot and cold layers are similar and each includes an array of cooling fins and frames or closure bars which are positioned on the parting sheets to define each layer. Frames or closure bars are placed along the edges of the layers to support the ends of the parting sheets. In addition to supporting the ends of the parting sheets, theses bars close off each layer, except where there is an air inlet or an air outlet. At the air inlets and outlets the fins provide support for the parting sheets.

To fabricate the heat exchanger, the hot and cold layers are stacked alternately one on top of another. The assembly may then be places in a vacuum furnace for brazing. During the brazing process the stack is squeezed so as to force the layers together.

The above description relates to heat exchangers that may be made with what are called "low temperature" materials. High temperature heat exchanger may be required where bleed air operating temperatures that exceed the capability of conventional metals (e.g., low temperature). However, some aircraft or other situations may require compact heat exchangers include aircraft engine pre-coolers, gas power plant recuperators, and solid oxide fuel cell waste heat recovery, etc. that are in the high temperature range (T>800° C.). Widely used materials which can withstand temperature up to 700° C. are metal superalloys, such as stainless steel, inconel, and Haynes. Ceramic heat exchanger technology provides a solution to the high temperature requirements and may allow for inlet temperatures up to 900° C. However, ceramic heat exchanger development has been limited in past years due to poor thermal conductivity and high machining/manufacturing costs.

BRIEF SUMMARY

In one aspect, a heat exchanger is disclosed. The heat exchanger includes a first additively manufactured layer including axial fins extending in a first direction and transverse fins extending in a second direction transverse to the first direction, the first layer defining a flow path in the first direction. The heat exchanger also includes a second additively manufactured layer including axial fins extending in the second and transverse fins extending in the first direction, the second layer defining a second flow path in the second direction.

In another aspect, a layer of a heat exchanger is disclosed. The layer includes a top additively manufactured layer including axial fins extending in a first direction and transverse fins extending in a second direction transverse to the first direction and a bottom additively manufactured layer including axial fins extending in the first and transverse fins extending in the second direction. The transverse fins of the top additively manufactured layer contact a peak portion of the axial fins of the bottom additively manufactured layer.

In another aspect, a method of forming a layer of a heat exchanger is disclosed. The method includes: additively manufacturing a top layer including axial fins extending in a first direction and transverse fins extending in a second direction transverse to the first direction; additively manufacturing a bottom layer including axial fins extending in the first and transverse fins extending in the second direction; and placing the top additively manufactured layer on the bottom additively manufactured layer such that the transverse fins of top additively manufactured layer contact a peak portion of the axial fins of the bottom additively manufactured layer.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 3A-3D show various patterns and shapes of the fins in the layer of FIG. 1;

The detailed description explains embodiments of the invention, together with advantages and features, by way of example with reference to the drawings.

DETAILED DESCRIPTION

Embodiments disclosed herein may enable the manufacture of a high temperature plate-fin (cross-flow) ceramic heat exchanger by a layer-by-layer additive manufacturing process. In one embodiment, the process is a so-called Laminated Object Manufacturing (LOM) process.

In the vertical build direction of a plain fin prior art heat exchanger, the plain fin designs are non-manufacturable by the additive LOM process. This is due to difficulty in handling of the thin and long fin strips in each tape layer and subsequent stacking up of the fin layers. The thin and long heat transfer fins are difficult to pick up in the manufacturing process.

Figure 1:
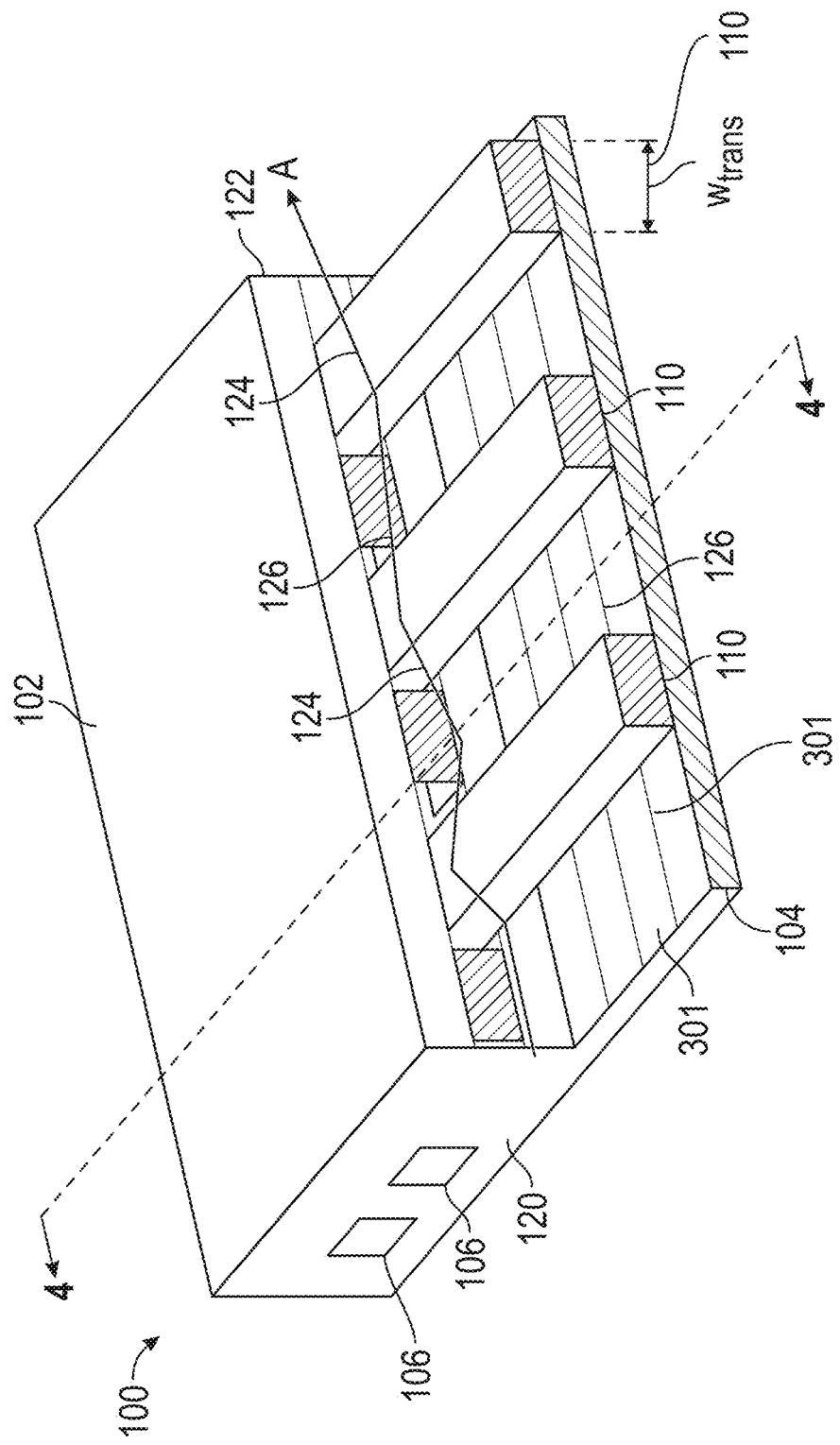
FIG. 1 is a partially cut-away perspective view of one layer of a heat exchanger according to one embodiment.

FIG. 1 shows a partial cross section of an example of single layer 100 of a heat exchanger. The layer 100 includes an upper layer 102 and a lower layer 104. These surfaces define a flow path, shown by arrow A. Each of the upper and lower layers 102, 104 are formed, in one embodiment, by a films of ceramic having the fins formed therein.

The flow path A is traversing axial fins 301 that extend in the general direction of arrow A. Transverse to the general flow direction of arrow A, a plurality of transverse fins 110. These transverse fins 110 sit on top of the axial fins 310 and block air from passing from directly from the inlet 120 to the outlet 122 of the layer 100. This causes the flow to raise and lower over them leading to rising 124 and falling 126 segments of the flow path. The transverse fins 110 can be made more aerodynamic (e.g., sinusoidal in shape) so that the pressure drop caused by the transverse fins 110 is minimal. They can also be placed in the fully developed flow region (if laminar) to disrupt the thermal boundary layer and improve heat transfer coefficient. Such a flow path may be referred to as a serpentine flow path from time to time herein. As shown, the inlet 120 includes several inlet holes 106. These holes 106 are examples only and can be any shape or can be omitted depending on the input header.

Figure 2A:
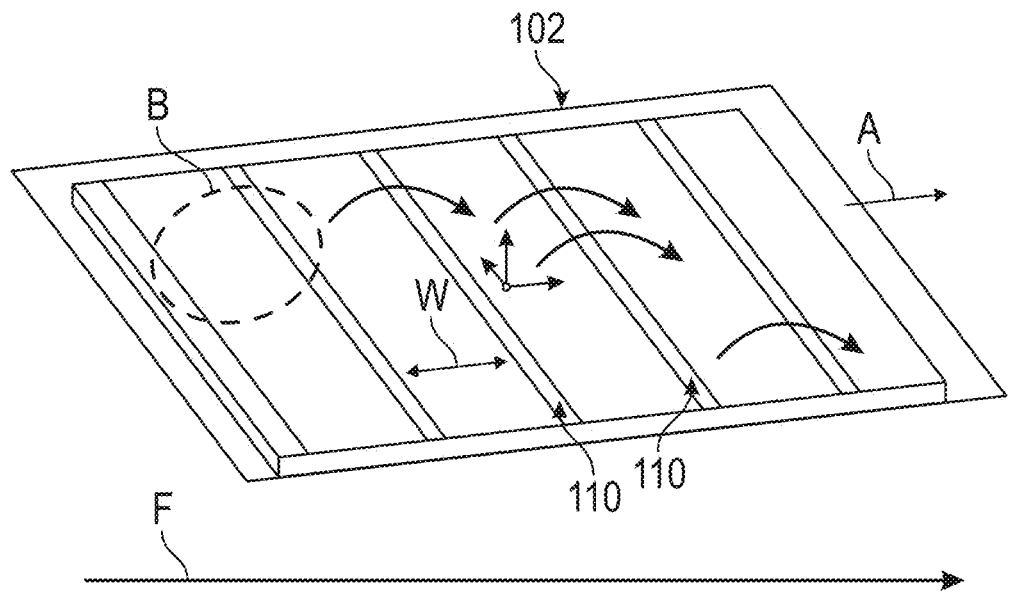
FIGS. 2A and 2B show top and bottom layers, respectively, of the layer of FIG. 1.
Figure 2B:
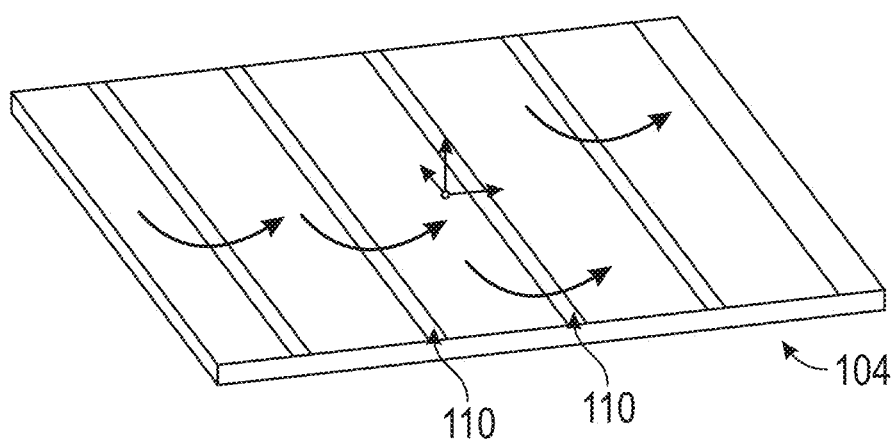

In FIGS. 2A and 2B, respectively, the upper layer 102 and the lower layer 104 are shown in greater detail. Both surfaces includes axial fins that are better illustrated in the FIG. 3A which is an enlarged view of the region defined by circle B in FIG. 2A. The axial fins 301 may be any type of fins having including fins having a block cross-section (FIG. 3B), a triangular cross section (FIG. 3C) and may be straight in the axial direction as shown in FIG. 3A or wavy as shown in FIG. 3D. Each fin 301 includes a valley 302 and a peak 304 with the peaks 304 extending upwardly from a base layer 306. The base layer may be a separate layer or may just be defined by the valleys in FIG. 3B.

In embodiments herein, the upper and lower layers are formed of ceramic. The layers as well as both the axial fins 301 and the transverse fins 110 are formed by an additive laminated object manufacturing process. In particular, thin ceramic tape layers form the base layer 306 and the transverse and axial fins 110, 301 are formed by layering additional tape layers (with holes typically formed therein) on top of the base layer 306. The tape layers can be formed from various materials, e.g., aluminum nitride, alumina, silicon nitride, etc. by tape casting process.

In the vertical build direction (shown by direction X in FIGS. 3B and 3C) of a prior art fin heat exchanger, it was not possible to form the axial fins by the additive laminated object manufacturing process in a manner that they are used to form a layer of a prior art heat exchanger. This is due to very difficult handling of the sheets including thin and long fins in each tape layer and subsequent stacking up of the layers as the thin and long heat transfer fins are difficult to pick up in the manufacturing process.

This problem is reduced or removed by adding the transverse fins 110. The transverse fins 110, in one embodiment, have a height ($h_{trans}$) and width ($w_{trans}$) that is greater than the width ($w_{peak}$) or height ($h_{peak}$), of any peak of the axial fins 310 (see FIGS. 1 and 4).

Referring again to FIGS. 2A and 2B, the top layer 102 is flipped over such that the upper surface of the transverse fins (which are perpendicular to the axial fins as illustrated) lie on the top of the axial fins of the lower layer 104. The transverse fins 110 provide structural support that allows the upper layer 102 to be stacked on top of the lower layer 104 without breakage. The distance (w) between the transverse fins 110 is the same on upper and lower layers 102, 104 in one embodiment. In both FIGS. 2A and 2B the flow direction is shown by arrow F.

As discussed above, the transverse fins 110 lead to a serpentine flow path as shown by arrow A. That is, when the top layer 102 is joined the bottom layer, the fins are offset from one another. This flow path can be optimized for minimum flow pressure drop while ensuring benefits through thermal boundary layer break-up. This can be done by varying the height of the axial and transverse fins. Also shown are curved arrows that indicate the air/fluid is passing over the fins 110.

Figure 4:
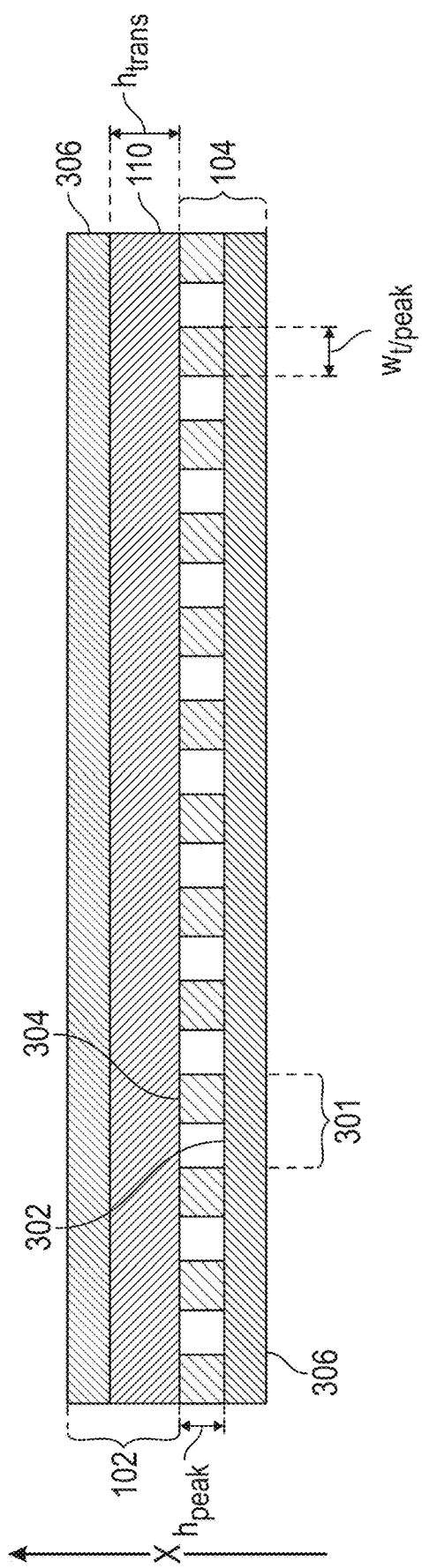
FIG. 4 shows a cross-section of the layer of FIG. 1.

Referring now to FIG. 4, a cross-section taken along section line 4-4 shows an upper layer 102 resting on and supported by a lower layer 104. The upper layer 102 includes a transverse fin 110 extending downwardly (e.g., in the opposite direction of direction X) from the base layer 306. The transverse fin 110 has a height $h_{trans}$ and sits on and makes contact with (in some cases direct contract) with the peak 304 of at least one of the axial fins 301. One or more of the axial fins 301 has a height $h_{peak}$ and at least one of the axial fins has a peak with a width $w_{peak}$. As shown the flow path A shown in FIG. 1 is traveling into the page in FIG. 4.

Figure 5:
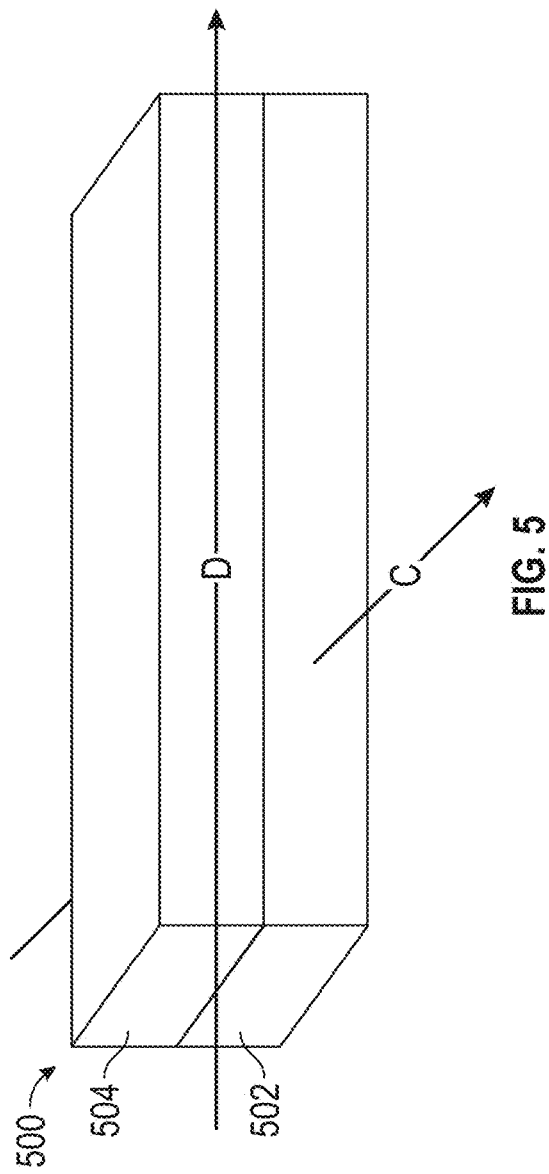
FIG. 5 shows a perspective view of heat exchanger according to one embodiment.

FIG. 5 shows a simplified version of a heat exchanger 500. The exchanger 500 includes a first layer 502 and a second layer 504 disposed on top of the first layer 502. Each of the layers 502, 504 can be formed as described above. The first layer 502 allows air flow in first direction C and the second layer 504 allows air flow in a second direction D. In one embodiment, first direction C and second direction D are perpendicular to one another. As such, the transverse fins in the first and second layers 502, 504 may be perpendicular to one another and the axial fins in the first and second layers 502, 504 may also be perpendicular to one another. Of course, a complete heat exchanger can include several layers 502, 504 which can be individually formed by a LOM process and later joined (e.g., brazed) together to make a full size heat exchangers.

In a given flow path layer (i.e., combination of a stack tape layers with axial and transverse fins), multiple tape layer may be stacked. The tape layers consist of transverse fins which are offset in the axial direction in at least one tape layer so that the serpentine flow path is formed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A layer of a heat exchanger comprising:
a top additively manufactured layer including a flat base layer and axial fins extending in a first direction on the base layer and transverse fins extending in a second direction on the base layer transverse to the first direction, the axial fins and the transverse fins extending outwardly from a single side of the base layer of the top additively manufactured layer; and a bottom additively manufactured layer including axial fins extending in the first direction and transverse fins extending in the second direction;

wherein upper surfaces of the transverse fins of the top additively manufactured layer contact a peak portion of the axial fins of the bottom additively manufactured layer.

2. The layer of a heat exchanger of claim 1, wherein the top additively manufactured layer is formed by a Laminated Object Manufacturing (LOM) process.

3. The layer of a heat exchanger of claim 2, wherein the bottom additively manufactured layer is formed by a LOM process.

4. The layer of a heat exchanger of claim 1, wherein, the axial fins of the top additively manufactured layer have a peak height less than a height of the transverse fins.

5. The layer of a heat exchanger of claim 4, wherein a width of the peaks is less than a width of the transverse fins.

6. The layer of a heat exchanger of claim 1, wherein the first and second directions are perpendicular to one another.

7. The layer of a heat exchanger of claim 1, wherein the first and second additively manufactured layers are formed of a ceramic material.

8. A method of forming a layer of a heat exchanger comprising:

additively manufacturing a top layer including a flat base layer and axial fins extending in a first direction on the base layer and transverse fins extending in a second direction on the base layer transverse to the first direction, wherein the axial fins and the transverse fins extending outwardly from a single side of the base layer of the additively manufactured top layer;

additively manufacturing a bottom layer including axial fins extending in the first direction and transverse fins extending in the second direction; and placing the top additively manufactured layer on the bottom additively manufactured layer such that upper surfaces of the transverse fins of the top additively manufactured layer contact peaks of the axial fins of the bottom additively manufactured layer.

9. The method of claim 8, wherein the top and bottom additively manufactured layers are formed by a Laminated Object Manufacturing (LOM) process.

10. The method of claim 8, wherein the first and second additively manufactured layers are formed of a ceramic material.

* * * * *